M. O. AYRES.
KETTLE.
APPLICATION FILED DEC. 20, 1918.
1,314,180.
Patented Aug. 26, 1919.
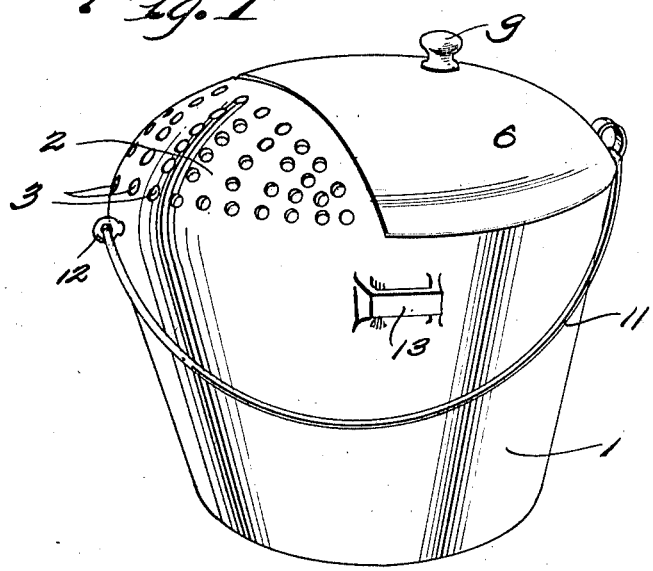
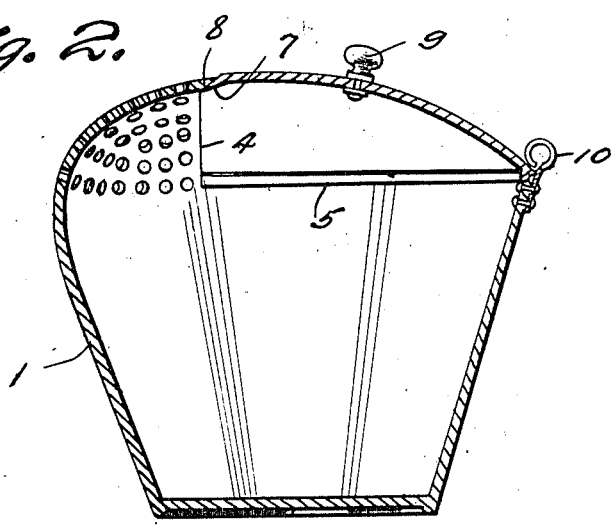
WITNESSES
Inventor
Martha O. Ayres
By
Richard Bowen,
Attorney

UNITED STATES PATENT OFFICE.

MARTHA O. AYRES, OF RIOBLANCO, COLORADO.

KETTLE.

1,314,180.　　　　　Specification of Letters Patent.　　Patented Aug. 26, 1919.

Application filed December 20, 1918. Serial No. 267,670.

*To all whom it may concern:*

Be it known that I, MARTHA O. AYRES, a citizen of the United States, residing at Rioblanco, in the county of Rio Blanco and State of Colorado, have invented certain new and useful Improvements in Kettles, of which the following is a specification.

This invention relates to domestic cooking utensils, and more especially to kettles; and the object of the same is to produce a kettle for cooking purposes and from which the water can be poured off, from vegetables or the like without opening or removing the cover.

This object is accomplished by making part of the top of the kettle integral with its body and perforated, and the remainder of the top in the shape of a cover removable when desired. The invention consists particularly in the specific details of construction more fully hereinafter described and claimed and shown in the drawings, wherein—

Figure 1 is a perspective view, and

Fig. 2 is a vertical sectional view, omitting the bail.

Referring to the drawings, the numeral 1 designates the body of this kettle. The top 2 is dome shaped and perforated as at 3, but is cut off on a vertical line 4 and from this line horizontally along the line 5 to the remote edge, thus leaving only about one-third of the top integral and the remainder open. Over the open portion is placed a cover 6 having a lip 7 at its free edge adapted to engage the fixed portion of the top where the latter is undercut at 8. The cover has a handle or knob 9. At the remote edge of the body, there is a spring catch 10 with which the cover engages when it is pushed into place.

As shown in Fig. 1, a bail 11 may be employed and this may be attached to eyes mounted on the body or may be attached at one end to the spring catch 10 and at the other end to an eye 12 formed on the body opposite the point where the first end is attached. Said body may also have handles 13 integral therewith, and by preference these stand opposite each other and on a line at right angles to the length of the bail. Obviously, the kettle may be lifted by these handles or by the bail. Obviously, also it may be tilted by either to pour water off the potatoes or other vegetables through the perforations 3, but when the bail is employed for this purpose, the reason for causing it to stand in alinement with the perforated area is clear.

In use, the cover is removed and the vegetables placed in the kettle with a suitable amount of water and the whole put on the stove, the cover being replaced. When now the time comes that the water should be poured off, the operator grasps the kettle by the handles or by its bail and tilts it forward so that the water runs out of the perforations, but the vegetables do not. When they are to be dumped out of the kettle, the cover is removed. After it is removed, it may be cleaned inside and out with ease, as may the kettle body.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent, is:—

1. A kettle of the character described including a perforated top and imperforate cover positioned upon said kettle and brought into locking engagement with the top thereof, and a spring catch on the wall of the kettle releasably engaging the cover for holding the same in the above mentioned locking engagement with said top.

2. The herein described kettle having a flat bottom, flaring sides, and a dome-shaped perforated top cut straight down on its inner edge and then horizontally to the opposite side, the inner edge of the top being undercut; and a cover for closing the remainder of the top of the kettle, the cover having a lip coacting with said undercut portion.

3. The herein described kettle having a flat bottom, flaring sides, and a dome-shaped perforated top cut straight down on its inner edge and then horizontally to the opposite side, the inner edge of the top being undercut; combined with a cover having a lip to co-act with said undercut edge, and a spring catch on the remote edge of the side wall, to engage the other edge of the cover when in place.

4. The herein described kettle having a flat bottom, flaring sides, and a dome-shaped perforated top cut straight down on its inner edge and then horizontally to the opposite side, the inner edge of the top being undercut; combined with a cover having a lip to engage said undercut edge, a spring catch on the wall for holding the free edge of the cover, an eye on the wall directly opposite the spring catch, and a bail linked into said catch and eye, for the purpose set forth.

In testimony whereof I affix my signature in presence of two witnesses.

MARTHA O. AYRES.

Witnesses:
 Mrs. J. S. DIXON,
 THAD S. HARP.